3,384,678
Patented May 21, 1968

---

3,384,678
CONVERSION OF ETHYLENE TO 1-OLEFINS
Paul R. Stapp, Bartlesville, Okla., assignor to Phillips Petroleum Company, a corporation of Delaware
No Drawing. Filed Mar. 26, 1965, Ser. No. 443,169
9 Claims. (Cl. 260—683.15)

ABSTRACT OF THE DISCLOSURE

Ethylene is converted to higher 1-olefins with a catalyst which comprises the product obtained on admixing at least one rare earth metal halide and at least one alkyl magnesium halide.

---

This invention relates to a method and catalyst system for the formation of 1-olefins. In one aspect, this invention relates to a method and catalyst system for the conversion of ethylene to higher 1-olefins.

Heretofore it has been thought that Grignard reagents would, in combination with certain metal halides, produce a catalyst for the polymerization of monoolefins such as ethylene into solid polymers such as polyethylene.

Quite surprisingly, it has now been found that ethylene can be converted to higher 1-olefins by contacting same with a catalyst formed on mixing at least one halide of a rare earth metal with at least one alkylmagnesium halide.

Accordingly, it is an object of this invention to provide a new and improved method and catalyst system for the formation of 1-olefins. Another object of this invention is to provide a new and improved method and catalyst system for the conversion of ethylene to higher 1-olefins.

Other aspects, objects and the several advantages of the invention will be readily apparent to those skilled in the art from the description and the appended claims.

According to this invention, ethylene is converted to higher normally gaseous and liquid 1-olefins, i.e., olefins containing from 4 to 20 carbon atoms per molecule or even higher, inclusive, by contacting same with a catalyst formed on mixing a rare earth metal halide and an alkylmagnesium halide represented by the formula RMgX wherein R is an alkyl radical containing from 1 to 12, preferably 1 to 10, carbon atoms, inclusive, and X is selected from the group consisting of chlorine, bromine and iodine.

The rare earth metal halides of this invention are the chlorides, bromides, and iodides of a metal having an atomic number of from 57–71, inclusive, and is selected from the group consisting of lanthanum, cerium, praseodymium, neodymium, promethium, samarium, europium, gadolinium, terbium, dysprosium, holmium, erbium, thullium, ytterbium, and lutetium, preferably lanthanum, cerium, praseodymium, neodymium, and samarium.

Examples of alkylmagnesium halides which can be employed as one of the components of the catalyst system of this invention are methylmagnesium bromide, methylmagnesium iodide, methylmagnesium chloride, ethylmagnesium iodide, n-propylmagnesium chloride, isopropylmagnesium bromide, tert-butylmagnesium iodide, n-hexylmagnesium bromide, n-octylmagnesium bromide, sec-decylmagnesium chloride, and n-dodecylmagnesium chloride. The preferred RMgX compounds are the methylmagnesium halides, particularly methylmagnesium iodide.

The formation of the active catalyst, i.e., the mixing of the catalyst components, is effected in the presence of an ether such as diethyl ether, dioxane and tetrahydrofuran. This catalyst formation diluent should be removed prior to contacting of the active catalyst with ethylene. Such diluent removal can be effected in a conventional manner such as by heating under vacuum. The time for contacting of the two catalyst components will range widely, generally from a few minutes to several days, preferably from about 5 minutes to about 5 days.

The conversion of ethylene to higher 1-olefins according to the process of this invention is carried out by contacting ethylene with the catalyst formed on admixing the above-defined catalyst components, the contacting being carried out in the presence of an inert diluent at a temperature of from about 150 to 250° C., preferably from about 160 to about 190° C. Suitable diluents include paraffinic, cycloparaffinic and aromatic hydrocarbons, preferably aromatic hydrocarbons. The amount of diluent which is employed in the process of this invention can vary over a wide range, but will generally comprise about 100 to 600 ml. of diluent per liter of reactor capacity. Examples of diluents include n-pentane, n-hexane, n-heptane, isooctane, cyclohexane, methylcyclohexane, benzene, toluene, xylene, Decalin, and the like.

The mol ratio of RMgX/rare earth metal halide will generally range from about 1:1 to about 6:1, preferably from about 2:1 to about 4:1, still more preferably about 3:1. The total amount of catalyst present in the reaction zone wherein the ethylene is converted can vary over a wide range, but will generally be from about 10 to about 200 total millimols of catalyst, i.e., mols of RMgX plus mols of rare earth metal halide initially charged, per liter of reactor capacity.

The conversion method of this invention is carried out at a pressure of at least 100 p.s.i.g., preferably above 500 p.s.i.g. at the reaction temperature. There is no presently apparent upper limit on the pressure other than that imposed by economics or the equipment employed. Frequently pressures can run as high as 5000 p.s.i.g. or higher. Reaction times will range widely such as from about a minute to several days, but will generally be from about 10 minutes to about 10 hours.

The process of this invention can be carried out batchwise or continuously, but it is presently preferred to operate on a batchwise basis. Following contacting of the ethylene with the above-described catalyst system, the reaction mixture can then be worked up for recovery of the produced 1-olefins. Suitable methods for recovery include extraction, crystallization, distillation, chromatography, and the like.

The higher 1-olefins which are produced according to the process of this invention find utility in such areas as intermediates in the production of biodegradable detergents, as intermediates in the synthesis of higher alcohols, as intermediates in the synthesis of high molecular weight amines, and the like.

EXAMPLE I

A run was carried out in which ethylene was converted to higher 1-olefins according to the process of this invention.

In this run, 6.2 grams (25 mmols) of anhydrous cerous chloride ($CeCl_3$) and 100 ml. of dry diethyl ether were charged to a 7-ounce bottle which was then capped. The air in the bottle was then replaced with dry nitrogen by means of a syringe, after which 25 ml. (75 mmols) of a 3 molar solution of methylmagnesium iodide in ether was added. The resulting mixture was stirred by means of a magnetic stirrer at 25° C. for 3 days.

The resulting material was a clear solution containing a white precipitate. This material was transferred to a dry box employing an inert atmosphere, and the ether was evaporated under vacuum. After the ether had all been evaporated, 200 ml. of benzene was added, and this material was evaporated under vacuum to a volume of 100 ml. The remaining material was then transferred to a 1-liter Magnedrive autoclave along with 100 ml. of benzene. The autoclave was then pressured to 940 p.s.i.g. with ethylene, after which it was heated to 150° C. After 30 minutes at 150° C. and 2 hours at 175° C., the pressure had fallen from 2000 p.s.i.g. to 1740 p.s.i.g. It was necessary to vent some ethylene during the heat-up as the pressure approached the limit of the equipment.

After cooling overnight, the autoclave was opened and 75 grams of dark liquid was separated from approximately 20 grams of solid polymer. The liquid product was analyzed by vapor phase chromatography and found to contain butenes, hexenes, and olefins up to $C_{18}$. The major $C_{12}$ and $C_6$ olefin peaks were identified by enhancement with authentic 1-hexene and 1-dodecene samples injected into the chromatographic column simultaneously with the liquid product.

EXAMPLE II

A run was carried out by essentially the same procedure as employed in Example I except that lesser amounts of each of the catalyst components were used.

In this run, the active catalyst was prepared in a 7-ounce bottle by charging 2.46 grams (10 mmols) of cerous chloride in 100 ml. of ether and 10 ml. (30 mmols) of a 3 molar solution of methylmagnesium iodide in ether. The resulting mixture was stirred at 25° C. for about 2 days. The ether in this mixture was then evaporated, after which 200 ml. of dry benzene was added, and the mixture evaporated to a volume of 100 ml.

The resulting benzene slurry of catalyst was transferred to the autoclave of Example I along with 100 ml. of additional benzene. The autoclave was then pressured to 800 p.s.i.g. with ethylene and then heated to 175° C. After 3.5 hours at 175° C., the pressure had dropped from 1360 p.s.i.g. to 900 p.s.i.g. The reaction was then run on an open ethylene valve for 2 hours. After cooling overnight, the autoclave was opened and 236 grams of clear, light yellow liquid was present along with a small amount of solid polymer. The catalyst was hydrolyzed with methanol, and the liquid product was analyzed by vapor phase chromatography. The calculated weight of produced olefins was 60 grams, and the olefins ranged from butenes to $C_{20}$.

EXAMPLE III

A run was carried out by essentially the same procedure employed in Examples I and II except that n-octylmagnesium bromide was employed.

In this run, 2.46 grams (10 mmols) of cerous chloride in 100 ml. ether and 30 ml. (30 mmols) of 1 molar n-octylmagnesium bromide in ether was stirred at room temperature for 20 hours. The ether was then evaporated to dryness, after which the material was pumped for approximately 1 hour at 1 mm. mercury absolute pressure at room temperature. Dry benzene in the amount of 100 ml. was added, and the mixture was shaken and evaporated to dryness. The residue was pumped for 13 hours at 1 mm. mercury absolute pressure at room temperature, after which 100 ml. of benzene was added and the mixture was allowed to stand for about 2 days.

The slurry of catalyst in 100 ml. of benzene was then transferred to the autoclave of the previous examples along with an additional 100 ml. of benzene. The reactor was then pressured to 690 p.s.i.g. with ethylene and heated to 175° C. After 2.5 hours at 175° C., the reactor was cooled, vented and opened. A semi-solid gelatinous mass was present in the reactor, and this material was mixed with 200 ml. of benzene. The clear, supernatant liquid which separated was found by vapor phase chromatography to contain small amounts of 1-olefins from butenes up to $C_{16}$.

EXAMPLE IV

In another run, 4.92 grams (20 mmols) of cerous chloride and 200 ml. of xylene were charged to a 300 ml. round-bottom flask equipped with a magnetic stirrer mounted in an oil bath. Then 20 ml. (60 mmols) of 3 molar methylmagnesium iodide in ether was added and the mixture was distilled under nitrogen for 3 hours until the volume of material in the flask had been reduced to approximately 100 ml. The dark, solid material present in the mixture was broken up with a spatula, and it was then pulverized by stirring. This catalyst was transferred to the autoclave of the previous examples along with 100 ml. of xylene. The reactor was then pressured to 1000 p.s.i.g. with ethylene and heated to 175° C. After 2 hours at 175° C., the pressure had fallen from 2000 p.s.i.g. to 1825 p.s.i.g. The temperature was then increased to 200° C. and maintained at this temperature for 3.5 hours, during which time the pressure fell from 1925 p.s.i.g. to 1625 p.s.i.g.

After stirring overnight while cooling, the autoclave was opened and a waxy material obtained therefrom. Xylene in the amount of 200 ml. was added to the waxy material and the resulting mixture was allowed to settle. A clear, supernatant liquid which separated from the mixture was found by vapor phase chromatography to contain 1-olefins from butenes up to $C_{16}$.

EXAMPLE V

A run was carried out in which a different rare earth metal halide was employed.

In this run, 2.48 grams (10 mmols) of praseodymium trichloride and 10 ml. (30 mmols) of a 3 molar solution of methylmagnesium iodide and 100 ml. of ether were stirred together at room temperature. An immediate reaction occurred which resulted in the formation of a flocculent white pricipitate. The mixture was stirred for 20 hours at room temperature, after which it was allowed to stand undisturbed for 24 hours. The ether was then evaporated off at room temperature at 1 mm. mercury absolute pressure and then pumped for an additional one hour at this pressure. Dry benzene in an amount of 100 ml. was then added and the resulting mixture was shaken, and evaporated to dryness. After all the liquid had been removed, the material was pumped for an additional 4 hours at 1 mm. mercury absolute pressure at room temperature to insure removal of the ether.

The catalyst was then taken up in 100 ml. of dry benzene and charged to the autoclave of the preceding examples along with an additional 150 ml. of dry benzene. The reactor was then pressured to 875 p.s.i.g. with ethylene and heated to 175° C. for 2.5 hours. During this time, the pressure fell from 1626 p.s.i.g. to 1300 p.s.i.g. The reactor was then cooled overnight, vented and opened and 252 grams of a light brown liquid was recovered which contained a small amount of solid polymer. Vapor phase chromatography showed approximately 10 grams of produced 1-olefins present ranging from butenes up to $C_{18}$.

For comparison with Example II, the procedure of Example II was repeated omitting the cerous chloride.

In this run, 10 ml. (30 mmols) of a 3 molar solution of methylmagnesium iodide in ether was charged to a bottle, after which the ether was evaporated off. Dry benzene in the amount of 200 ml. was then added and this solution was concentrated to 100 ml. by evaporation. The 100 ml. of benzene slurry of methylmagnesium iodide was charged to the autoclave of Examples I and II and pressured to 800 p.s.i.g. with ethylene. The reaction mixture was then heated to 175° C. and only a very slight pressure drop had occurred after 3⅓ hours. The reactor was then cooled, vented and opened. The contents thereof revealed only trace quantities of butenes and hexenes under vapor phase chromatography. There was no indication of any material higher than $C_8$.

Thus, it appears that the rare earth metal halide is necessary to the catalyst system of this invention.

For comparison with the above examples of this invention a procedure similar to those examples was repeated substituting phenylmagnesium bromide for the alkylmagnesium bromide of those examples.

In this run, 2.46 grams (10 mmols) of cerous chloride in 100 ml. of ether and 10 ml. (30 mmols) of 3 molar phenylmagnesium bromide in ether were stirred at room temperature for 20 hours. The bright yellow liquid and white solid precipitate present after the stirring was evaporated to dryness and pumped for approximately 1 hour at 1 mm. mercury absolute pressure. Benzene in the amount of 100 ml. was then added after which the benzene was evaporated off and the residue was pumped for 4 hours at 1 mm. mercury absolute pressure. An additional 100 ml. of benzene was then added and this slurry was transferred to the reactor of the above examples along with 150 ml. of benzene. The reactor was then pressured to 1100 p.s.i.g. with ethylene and heated to 175° C. About 5 minutes after reaching 175° C., a vigorous exothermic reaction occurred and the temperature rose rapidly to 280° C. After 55 minutes the temperature was 210° C. and the pressure was 650 p.s.i.g. The reactor was repressured to 1100 p.s.i.g. and allowed to cool to 175° C., after which it was run on an open ethylene valve for 1⅔ hours. After cooling, venting and opening the reactor, it was found to contain 330 grams of solid ethylene polymer.

This run clearly shows the difference in results obtained with alkylmagnesium halides as compared to arylmagnesium halides. In this particular run, using phenylmagnesium bromide, a solid polyethylene was obtained and there was no evidence of higher 1-olefins similar to those obtained in Examples I through V, being formed along with the polyethylene.

Reasonable variations and modifications are possible within the scope of this disclosure without departing from the spirit and scope of the invention.

I claim:
1. A method for the conversion of ethylene in major amounts to higher normally gaseous and liquid 1-olefins which comprises contacting ethylene with a catalyst which comprises the product obtained on admixing at least one rare earth metal halide selected from the group consisting of cerium chloride, cerium bromide, cerium iodide, praseodymium chloride, praseodymium bromide, and praseodymium iodide and at least one alkylmagnesium halide represented by the formula RMgX wherein R is an alkyl radical containing from 1 to 12 carbon atoms, inclusive, and X is selected from the group consisting of chlorine, bromine and iodine, the mol ratio of RMgX/rare earth metal halide being in the range of from about 1:1 to about 6:1 and the ethylene contacting temperature being sufficiently elevated to promote the formation of said higher 1-olefins.

2. The method according to claim 1 wherein the ethylene-catalyst contacting is carried out in the presence of an inert diluent.

3. A method for the conversion of ethylene to higher normally gaseous and liquid 1-olefins which comprises contacting ethylene with a catalyst which comprises the product obtained on admixing methylmagnesium iodide and cerous chloride in the mol ratio of methylmagnesium iodide/cerous chloride from about 1:1 to about 6:1, said contacting being carried out in the presence of an inert diluent at a temperature of from about 150 to about 250° C.

4. A method for the conversion of ethylene to higher normally gaseous and liquid 1-olefins which comprises contacting ethylene with a catalyst which comprises the product obtained on mixing octylmagnesium bromide and cerous chloride in a mol ratio of octylmagnesium bromide/cerous chloride of about 1:1 to about 6:1, said contacting being carried out in the presence of an inert diluent and at a temperature in the range of from about 150 to about 250° C.

5. A method for the conversion of ethylene to higher 1-olefins containing from 4 to 20 carbon atoms per molecule, inclusive, which comprises contacting ethylene with a catalyst which comprises the product obtained on admixing methylmagnesium iodide and praseodymium chloride in a mol ratio of methylmagnesium iodide/praseodymium chloride of from about 1:1 to about 6:1, said contacting being carried out in the presence of an inert diluent and at a temperature in the range of from about 150 to about 250° C.

6. A catalyst system which comprises the product obtained on admixing at least one rare earth metal halide selected from the group consisting of cerium chloride, cerium bromide, cerium iodide, praseodymium chloride, praseodymium bromide, and praseodymium iodide and an alkylmagnesium halide represented by the formula RMgX wherein R is an alkyl radical containing from 1 to 12 carbon atoms, inclusive, and X is selected from the group consisting of chloride, bromine and iodine, the mol ratio of RMgX/rare earth metal halide being in the range of from about 1:1 to about 6:1.

7. A catalyst system which comprises the product obtained on admixing methylmagnesium iodide and cerous chloride in a mol ratio range of from about 1:1 to about 6:1.

8. The catalyst system formed on admixing octylmagnesium bromide and cerous chloride in a mol ratio range of from about 1:1 to about 6:1.

9. The catalyst system formed on admixing methylmagnesium iodide and praseodymium chloride in a mol ratio range of from about 1:1 to about 6:1.

References Cited

UNITED STATES PATENTS

| | | | |
|---|---|---|---|
| 2,953,531 | 9/1960 | Anderson et al. | 252—429 |
| 3,048,571 | 8/1962 | Stroh et al. | 260—94.9 X |
| 3,056,770 | 10/1962 | D'Alelio | 260—94.9 X |
| 3,179,647 | 4/1965 | Mulley et al. | 260—94.9 |

OTHER REFERENCES

Rochow et al., "The Chemistry of Organometallic Compounds," pub. by Wiley and Sons, Inc., New York (1957), p. 94.

PAUL M. COUGHLAN, JR., *Primary Examiner.*